June 14, 1955     C. G. BRANSTRATOR ET AL     2,710,760

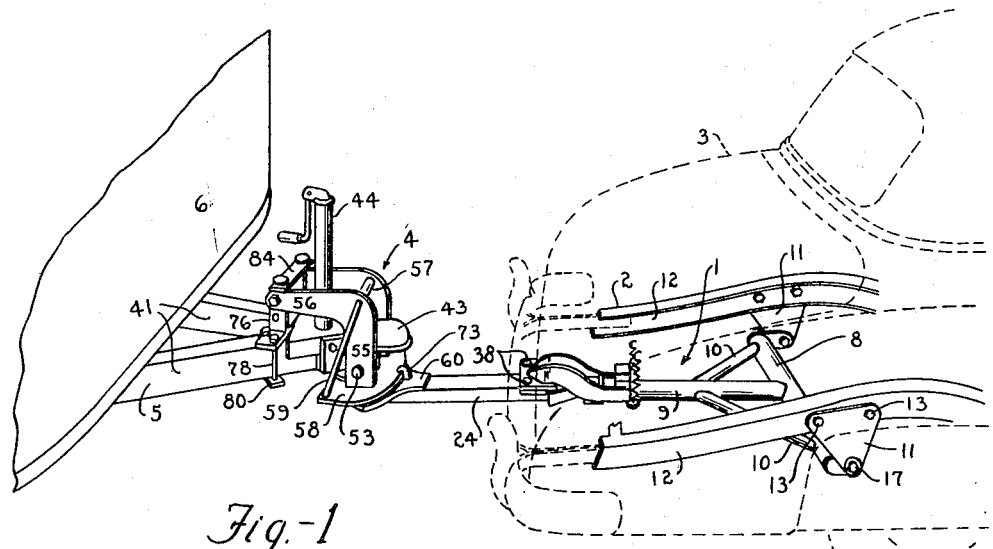
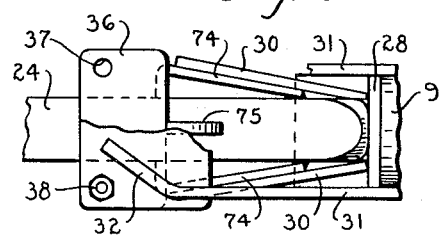
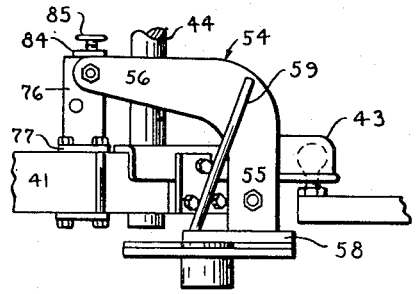
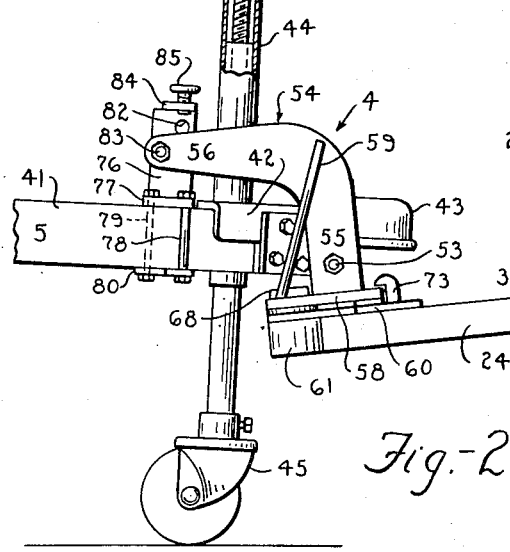
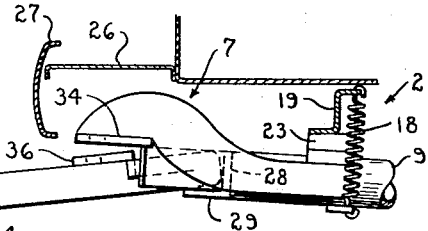
INVENTORS
CLEM G. BRANSTRATOR AND
WAYNE R. BRANSTRATOR
BY
Charles S. Penfield
ATTORNEY

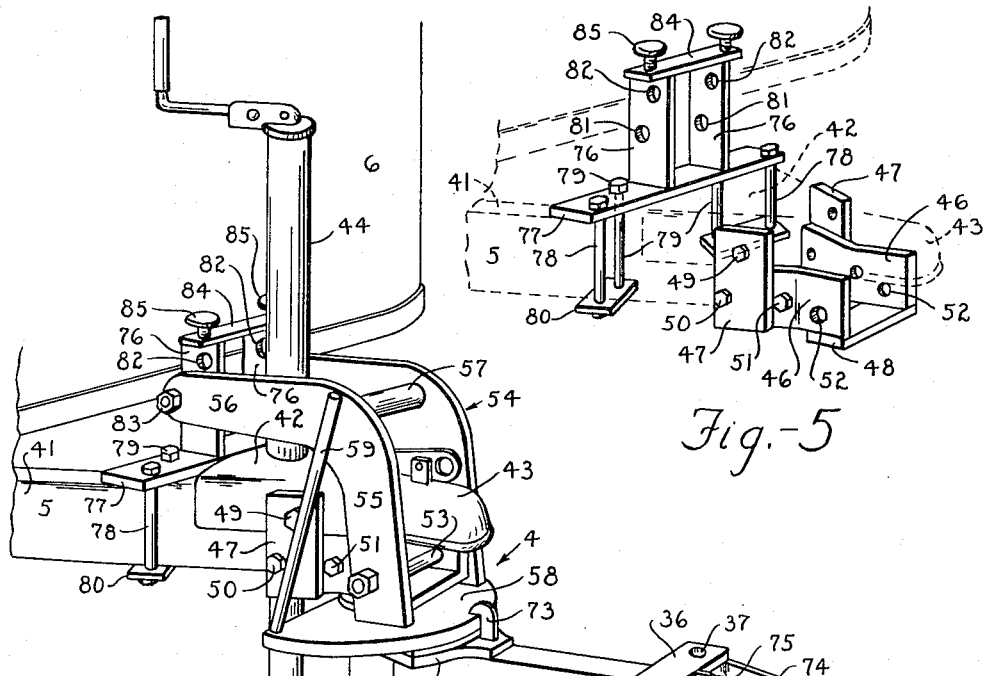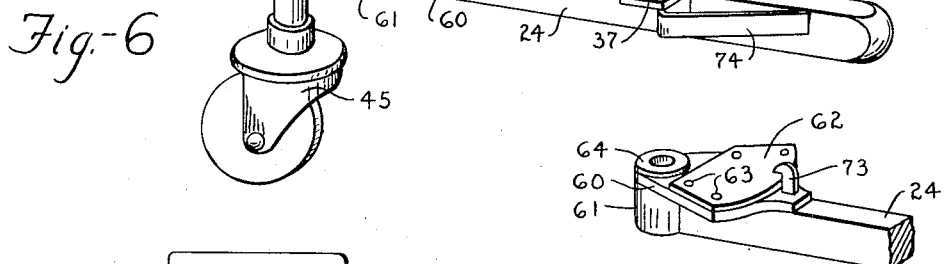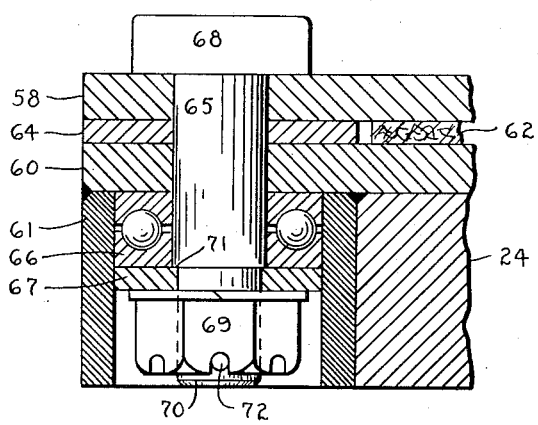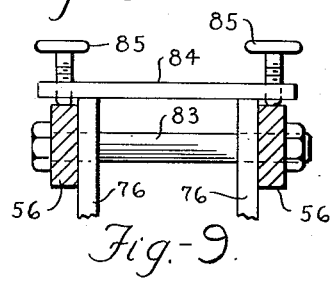

VEHICLE DRAFT MEANS WITH PLURAL ARTICULATION AXES

Filed Feb. 5, 1951     4 Sheets-Sheet 3

INVENTORS
CLEM G. BRANSTRATOR AND
WAYNE R. BRANSTRATOR
BY
Charles S. Penfold
ATTORNEY June 14, 1955  C. G. BRANSTRATOR ET AL  2,710,760
VEHICLE DRAFT MEANS WITH PLURAL ARTICULATION AXES
Filed Feb. 5, 1951  4 Sheets-Sheet 4
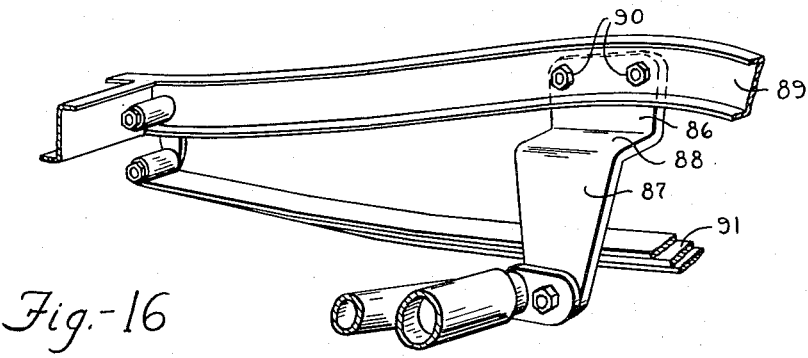
Fig.-16
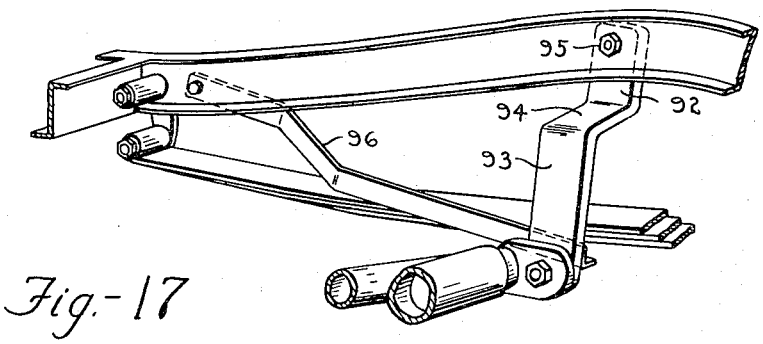
Fig.-17
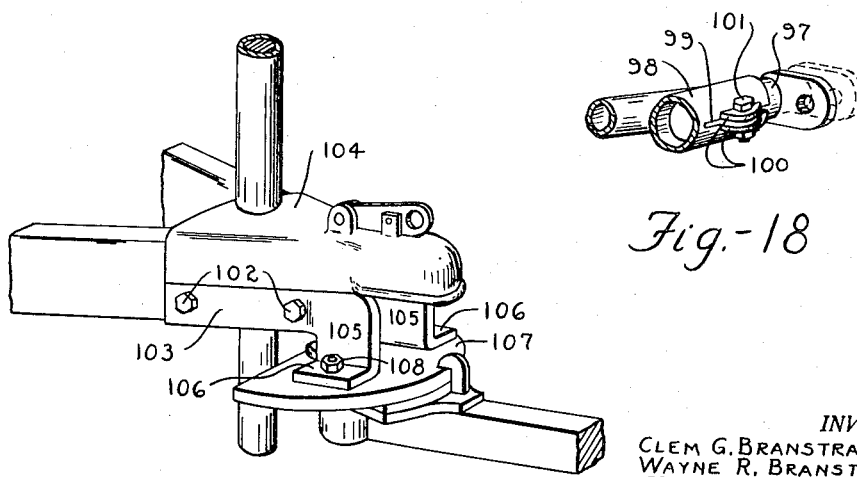
Fig.-18
Fig.-19
INVENTORS
CLEM G. BRANSTRATOR AND
WAYNE R. BRANSTRATOR
BY
Charles S. Penfold
ATTORNEY United States Patent Office 2,710,760
Patented June 14, 1955

2,710,760

VEHICLE DRAFT MEANS WITH PLURAL ARTICULATION AXES

Clem G. Branstrator and Wayne R. Branstrator, Fort Wayne, Ind.

Application February 5, 1951, Serial No. 209,333

8 Claims. (Cl. 280—494)

This invention relates generally to couplings and more particularly is directed to a coupling commonly known as a "hitch" which may be utilized wherever applicable but is preferably used in operatively connecting two vehicles such as a trailer or coach to an automotive vehicle or car.

The primary object of the subject invention is to provide a coupling embodying improved principles of design and construction which promotes safety, and is of such a character that it can be readily manipulated by one person.

An important object of the invention is to provide a unique coupling which operates automatically to stabilize and control, within practicable limits, any abnormal condition of movement which may occur between the trailer and car while they are traveling on a road bed. The arrangement is preferably such that any relative movement which takes place between the vehicles that tends to adversely affect their proper pulling or operative relationship will cause certain of the components of the coupling to automatically respond and immediately counteract and stabilize or normalize any abnormal condition.

A significant object of the invention is to provide a novel coupling comprising, among other things, a socket and a tongue which are so designed and constructed that they can be readily interconnected even though not exactly in alignment with one another when the car is backed up to effect the connection. In other words, the arrangement is preferably such that after the tongue on the trailer is located it is merely necessary to drive the car backwardly so that the socket carried thereby will receive the tongue. The socket and tongue are so shaped that the socket will automatically move the tongue and guide and properly seat the tongue in the socket when the two are not directly in alignment. This alleviates the necessity of perhaps several back-ups before a connection can be established.

A particular object of the invention is to provide improved means for supporting the socket for pivotal movement in a predetermined vertical plane.

A specific object of the invention is to provide an arrangement whereby the hangers above referred to are adapted to be attached to the ends of the axle by fittings, each of which may be adjusted and secured relative to the axle in any one of an infinite number of rotative positions so as to facilitate installation of the supporting means in different makes or models of cars.

Also, an object of the invention is to provide a setup whereby the fittings connecting the hangers with the axle are pivotally connected to the hangers at locations preferably on a level below and to the rear of the car axle axis. This arrangement distributes a part of the hitch load at appropriate locations about as far forward with respect to the car that is practical in order to afford a well balanced assembly contributive to good driving.

Another object of the invention is to provide a resilient abutment on the rod and resilient means for holding and urging the rear or trailing end of the rod upwardly so that the abutment engages a part of the car frame to maintain the socket in a predetermined position for connection with the tongue. The resilient abutment also serves to cushion and limit upward movement of the rod while the socket and tongue are connected and the car and trailer are in motion. This organization of components, among other things, prevents the rear end of the T-frame and socket from ever engaging or banging against the rear bumper and other parts of the understructure of the car.

Another specific object of the invention is to provide a socket and supporting means therefor which are substantially concealed from view and hence canot in any way detract from the appearance of the car.

An additional object of the invention is to provide improved means for attaching and supporting the normalizing apparatus above referred to to the forwardly extending V-frame on the trailer or coach.

A further object of the invention is to provide a tongue assembly whereby the carrier, bearing plates, friction means and tongue as a unit can be readily conected and disconnected with respect to the V-frame so that when desired the conventional socket on the frame may be utilized.

A still further object of the invention is the provision of means on one of the plates which may engage the other plate to assist in preventing the plates from spreading apart and at the same time assist in supporting the tongue.

Another object of the invention is to provide various means which will prevent rattle between the tongue assembly and the attaching means therefor and substantially dampen any noise that might occur between the bearing plates.

Additional objects of the invention reside in its economy of construction and assembly, efficiency in adjustment and operation, strength, stability and durability.

Many other objects and advantages of the invention will become apparent after the description hereinafter set forth is considered in conjunction with the drawings annexed hereto.

In the drawings:

Figure 1 is a perspective view illustrating the coupling embodying the invention applied to a car and trailer;

Figure 2 is a side view in elevation of the coupling and portions of the car and trailer showing the tongue located in an angular position in the socket;

Figure 3 is a top view of the socket and tongue assembled with portions broken away to show details of construction;

Figure 4 is a side view in elevation of parts of the tongue assembly as applied to the trailer;

Figure 5 is a perspective view showing the means for attaching and adjusting the tongue assembly with respect to the trailer;

Figure 6 is an enlarged perspective view of the tongue assembly as applied to the trailer;

Figure 7 is an enlarged vertical section taken through an appropriate part of the tongue assembly to depict in particular the assembly of the plates and friction means above referred to;

Figure 8 is a partial perspective view showing the tongue and a bearing plate carried thereby;

Figure 9 is a transverse sectional view illustrating the means whereby the carrier of the tongue assembly can be adjusted and held in any one of a plurality of pivotal positions within a vertical plane;

Figure 10 is a top view of the supporting means for the socket as applied to the framework of a car;

Figure 11 is a side view in elevation of the supporting means and socket as applied to a car;

Figure 12 is a perspective view illustrating the manner in which the fittings connect the hangers to the axle of the T-frame;

Figure 13 is a transverse section showing the means for resiliently supporting the supporting means and also a resilient abutment means for the supporting means;

Figure 14 is a side elevational view of the socket;

Figure 15 is a top view of the socket;

Figure 16 is a perspective view exemplifying a different way of attaching the T-frame to a car frame;

Figure 17 is a perspective view similar to Figure 16 showing another way of attaching the T-frame to a car frame;

Figure 18 is a perspective view showing a different way of adjustably securing fittings to the axle or cross-member of the T-frame; and Figure 19 is a perspective view depicting a modified form of tongue assembly.

As clearly illustrated in Figures 1, 10 and 11 of the drawings, the coupling embodying the subject invention includes, among other things, a socket supporting means or assembly generally designated 1 carried by a framework 2 of a car 3 and a tongue assembly generally designated 4 carried by the forwardly extending conventional V-frame 5 of a trailer 6.

The supporting means may be designed and constructed as desired but as herein depicted is preferably concealed from view and made in the form of a T-frame which carries a socket coupling member generally designated 7. The T-frame is comprised of a pivotal cross-member or axle 8 and a longitudinal draw rod 9 arranged at right angles to the axle. The inner end of the rod is welded or otherwise secured to the mid-point of the axle and the ends of diagonal braces 10 are respectively welded to the axle and rod. The axle, rod and braces are preferably made from piping of appropriate sizes to promote standardization and impart strength to the assembly and at the same time reduce the weight.

A hanger 11, generally triangular in shape, is firmly attached to the exterior surface of each side rail 12 of the framework 2 at longitudinally spaced points by a pair of bolts 13. Fittings of a novel character are employed to connect the axle to the hangers. As clearly shown in Figures 10 and 12, each fitting includes a solid cylindrical insert 14 disposed in the axle and a link 15 having one end immovably secured to the insert by butt welds. The opposite ends 16 of the links are connected to and between the lower corners of the hangers by bolts 17 which serve as pivots to allow the T-frame to pivot or rock about the axis of the axle. The arrangement is preferably such that each fitting may be adjusted to any desired rotative and/or longitudinal position with respect to the axle, and when once adjusted to the correct position, the insert is welded to the axle. This matter of adjustment is important, because in some installations it may be desirable to locate the T-frame lower and farther forward than shown in Figures 11 and 12 to clear certain parts of the chassis, in which event, the inserts would be adjusted and secured so that the links 15 would assume depending positions. In other installations, it may be desirable to increase the length of the axle by telescoping the inserts 14 outwardly and then welding them in place. With this unique setup the T-frame may be readily installed in an underslung position to cars of makes or models having variable chassis specifications. As pointed out above, the T-frame is preferably connected to the hangers at points below and in back of the axis of the rear car axle to place and distribute the load of the trailer as far forward as is practically possible so that the trailer will be caused to substantially correspond with the movements of the car.

As alluded to above, one object of the invention resides in supporting the trailing extremity of the T-frame. This may be done in various ways but, as herein shown in Figure 13, is preferably accomplished by utilizing a pair of strong helical springs 18, the upper ends of which are hooked in holes provided therefor in a transverse rail 19 of the framework 2 and their lower ends in holes 20 provided in the ends of a cleat 21 welded to the underside of the rod 9. A mounting member 22 is arranged adjacent to the upper side of the rod and carries resilient means 23 in the form of a rubber abutment, acting as a shock absorber, which is normally held against the underside of the transverse rail 19 by the springs when the socket 7 is disconnected from the tongue assembly. The socket and parts associated therewith are thus held in a predetermined position for connection with a tongue coupling member 24 and clear of a gasoline tank 25, a splash plate 26 and a bumper 27, as exemplified in Figure 11.

The socket coupling member 7 carried by the trailing end of the rod 9 will now be described. It may be formed in various ways, but is preferably designed and constructed as shown in Figures 3, 14 and 15. An angle piece is secured to the end of the rod so that its upright leg 28 constitutes a stop for limiting inward movement of the tongue 24 into the socket and its other leg 29 constitutes the bottom wall of the socket and serves as a rest for the tongue. A pair of corresponding elongated guides 30 are welded to the angle piece so that they constitute converging side walls of the socket. More particularly in this respect, the marginal ends and edges adjacent the inner extremities of the guides are respectively welded to the legs 28 and 29. The outer extremities of the guides extend rearwardly beyond the leg 20. A pair of corresponding elongated reinforcing members 31 have their inner ends welded to the sides of the rod and sides of the upright leg 28 of the angle piece. The reinforcing members extend upwardly and rearwardly and their outer extremities project beyond the outer extremities of the guides and are preferably inturned as indicated at 32. The members 31 are disposed in parallel relation throughout substantially their entire length and their outer extremities are formed with lower marginal edges 33 which are arranged in spaced apart predetermined parallel relationship with respect to the upper marginal edges of the guides 30. A generally square tie member 34 is arranged in the space and welded to the aforesaid marginal edges. The tie member is thus jointly supported by the guides and reinforcing members. It is so located that it serves to guide or pilot the rounded entrance end of the tongue into the socket when the tongue is particularly in an inclined position as shown in Figure 2. This tie member is provided with holes 35 in its outer corners. As illustrated in Figures 3 and 6 another tie member 36, complementary to the tie member 34, is welded to the upper side of the tongue 24 and is provided with holes 37 which are adapted to register with holes 35 when the tongue is in the socket so that bolts 38 can be extended through the holes for securing the tie members in abutting relation as shown in Figure 1.

As shown in Figure 13, the mounting member 22 for the resilient bumper 23, above referred to, includes a bridge portion 39 to which the bumper is secured and a pair of downturned portions 40 which are welded to the upper marginal edges of the reinforcing members 31. If found desirable, the bumper can be secured to the transverse end rail 19 of the car frame or some other part of the chassis. In some instances it may be necessary to increase the thickness of the bumper and/or its mounting in order to locate the socket in the correct position with respect to a particular make of car. Means may also be provided whereby the mounting and/or bumper can be adjusted to different elevations to facilitate installation requirements.

The tongue assembly 4 and means for attaching it to or supporting it on the trailer are clearly illustrated in Figures 2, 5 and 6 and will now be described. The conventional V-frame on most trailers is comprised of a pair of converging channel members 41 permanently secured at their outer ends. A generally triangular casting 42 is usually mounted on the channel members. The forward end of the casting is provided with a conventional socket 43 which is adapted to receive a conventional ball carried by the bumper of a car. This casting also supports a conventional jack 44 having a detachable wheel assembly 45.

The attaching means or supporting assembly may be constructed as desired but preferably includes a bracket unit secured to the outer sides of the channel members and casting. More particularly in this respect, the bracket includes a pair of elongated horizontal supports 46, a pair of upstanding members 47, and a bridge 48 (see Figure 5). The inner extremities of the supports 46 are offset and diverge to conform to the shape of the V-frame and their outer extremities are parallel and extend forwardly in advance of the V-frame below the socket 43. The bridge 48 is welded to the lower marginal edges of the outer extremities of the supports for imparting strength and rigidity to the bracket. The upstanding members overlap the side walls of the casting 42 and also overlap the inner extremities of the supports at right angles and are welded thereto. The inner extremity of each support is preferably of a thickness corresponding to the side wall thickness of the casting 42, so that the upstanding member will be disposed parallel to the outer surfaces of the channel members 41. Each support is also of a width to nest in the space between a side wall of the casting and the lower marginal edge of a channel member so that the casting will assist in bracing the supports. A bolt 49 extends through the upper ends of the members 47, side walls of the casting, and channel members 41 of the V-frame; a bolt 50 extends through the upstanding members, supports and channel members; and a bolt 51 extends through the supports and channel members. These bolts firmly detachably anchor the bracket unit to the V-frame. The outer ends of the supports are provided with apertures 52 through which a relatively strong bolt 53 horizontally extends for pivotally supporting a carrier generally designated 54 and components associated therewith within a vertical plane.

The carriage is preferably comprised of a pair of parallel angular arm members, each having a depending portion 55 and a rearwardly extending portion 56 arranged substantially at right angles to portion 55. The bolt 53 extends through holes in the lower extremities of the portions 55 for pivotally supporting the carriage. A reinforcing spacer 57 has its ends welded to the arm portions. The arms straddle the supports 46, socket 43 and jack 44. A top horizontal flat bearing plate 58 constructed of relatively thick metal stock is welded to the marginal ends of arm portions 55. This plate, constituting a brake shoe component of the normalizing apparatus, is preferably half-round in shape and of a size sufficient to provide a ledge completely surrounding the lower portions of the arm members. This plate is reinforced by a pair of struts 59, the ends of which are respectively welded to the arm members at points intermediate their ends and to the corners of the plate. The arms and plate are thus rigidly secured together to withstand any severe shocks or strains to which they may be subjected.

The normalizing apparatus also includes a lower horizontal bearing plate or brake shoe 60 constructed of thick metal stock which is welded to the upper side of the tongue 24 at its inner end. The tongue is preferably made of heavy bar stock, square in cross-section. A tubular cylindrical enlargement 61 is welded to its inner end to afford a greater supporting surface for the lower plate 60 and at the same time promotes stabilization between the tongue and top plate. A friction producing bearing means or element 62, preferably constructed from a conventional high pressure external type of brake lining material, is superimposed upon and secured to the lower plate by rivets 63 as shown in Figure 8. A spacer washer 64 of a thickness corresponding to the thickness of the friction element is welded to the cylindrical enlargement 61 of the tongue. The lower plate and friction element are of a size somewhat smaller than the top plate for clearance purposes when the tongue is swung relative to the carriage. The upper end of the cylindrical enlargement 61 abuts the inner extended end of the lower plate and is welded thereto as shown in Figure 7.

A strong king bolt 65, shown in Figure 7, extends through aligned holes provided in the top plate 58, washer 64, lower plate 60, a ball bearing assembly 66, and a stabilizing element 67 supporting the bearing assembly. This king bolt has a relatively large head 68 which overlies the top plate and a nut 69 is secured to the reduced threaded end 70 of the bolt, which reduction forms a shoulder 71 on the bolt which is engaged by the stabilizing element 67 so that excessive tightening of the nut 69 will not affect relative movement between the tongue and carriage. It will be noted that the ball bearing assembly and nut are completely housed in and protected by the enlargement 61. A cotter pin 72 or other locking means may be used to prevent accidental displacement of the nut 69. Grease having a high viscosity may be pressed into the enlargement.

As shown in Figures 1, 2, 6 and 8 the lower plate is preferably provided with a hook 73 which may engage the upper surface of the top plate to assist in holding the plates in parallel relation when undue downward stress is placed on the outer end of the tongue.

The outer extremity of the tongue 24, as clearly illustrated in Figures 3 and 6, is preferably provided with a pair of guide members 74, the forward ends of which are welded to the sides of the tongue and their inner ends are offset and welded to the sides of the tongue and to the tie member 36 in a manner to locate the guide members in converging angular relationship slightly less than the converging angle formed by the guides 30 which define the side walls of the socket 7. It will be noted that the guide members are set back a sufficient distance from the rounded end of the tongue so that the end may readily accommodate itself to the socket in advance of the guide members. An inclined cam 75 is welded to the top side of the tongue and tie member 36 to cause the tie member 34 on the socket 7 to ride upon the tie member 36 so that the opposed edges of the tie members will never engage one another to prevent connection of the socket and tongue.

As pointed out above, the invention includes means whereby the carriage and tongue as a unit may be adjusted to any one of a plurality of pivotal positions within a vertical plane. This adjusting means, clearly shown in Figures 2, 5 and 6, includes an attachment having a pair of standards 76 welded to a cross bar 77, the latter bridging the channels 41 of the V-frame. Bolts 78 and 79 straddle each channel and extend through one extremity of the cross bar 77 and a small cross member 80 for firmly anchoring the attachment in place. The standards 76 are each provided with a lower aperture 81 and an upper aperture 82. The inner ends of the arms of the carriage are provided with holes. The holes and apertures 81 and 82 are all located the same radial distances from the axis of bolt 53. A bolt 83 is adapted to extend through the holes and the pair of lower apertures 81 to place the tongue 24 in an inclined position for entry into the socket 7 as depicted in Figure 2 or it may be extended through the upper apertures 82 to locate the tongue assembly substantially in a horizontal position as shown in Figure 1 to permit one to connect the tie members 34 and 36 by the bolts 38. A reinforcing bridge plate 84 is welded to the upper ends of the standards 76. The ends of this plate project laterally from the standards and carry set screws 85 which can be tightened against the inner ends of the carriage arms when the carriage is in the horizontal position to prevent rattle between the carriage and/or socket assembly and attaching means therefor.

As explained above, the socket 7 and tongue 24 of the coupling can be readily connected and disconnected by a single person. The connection is preferably accomplished by manually tilting the tongue assembly 4 to the position exemplified in Figure 2 and securing it in place by the bolt 83, after which the tongue is swung to a position substantially in alignment with the longitudinal axis of the trailer.

If the forward entering end of the tongue is not at the proper height for reception in the socket 7, it can be readily obtained by manipulating the jack 44. The car is then backed up so that the end of the tongue will be received in the socket as shown in Figure 2, after which the bolt 83 is removed. The jack is then operated to elevate the front end of the trailer until the tie member 36 bears flat against tie member 34 on the socket. The bolts 38 are then extended through the aligned holes in the members to lock the tongue in the socket. The front end of the trailer is again raised or adjusted to a position to align the holes in the inner ends of the carriage arms with the upper apertures 82 in the standards 76 whereupon the bolt 83 is passed through the holes and apertures to lock the carriage against movement as shown in Figure 1. The set screws 85 are tightened for the purpose described above. The jack is once again operated to lift the trailer and place the lower end of the jack a safe distance from the ground and so that the wheel assembly 45 can be detached if so desired. The car and trailer are thus operatively connected. As pointed out above, this unique arrangement permits movement of the tongue to substantially any position desired to effect a connection with the socket 7. This universal range of movement is highly important because the connection can be made notwithstanding variations in ground level, car clearances, and differences in the sizes, shapes and weights of trailer frames and hitches. It is, of course, to be understood that the foregoing procedure to effect the connection may be varied. For example, in some instances the ground level or the relationship of the coupling components may be such that it is not necessary to tilt the tongue prior to its introduction into the socket. In other instances, the tongue and socket supporting means can be manually pressed downwardly to place the tie members in abutment, without elevating the front end of the trailer.

In view of the foregoing description it will be manifest that the tongue and socket and means supporting the socket are firmly interconnected to provide a straight through substantially rigid connection between the king pin 65 and the pivotal connections 17 between the T-frame and car frame, and since the carriage is immovably secured to the trailer the plate 60 and tongue cannot move in a vertical plane relative to the plane of plate 58 on the carriage, "nosediving," "surge," and pitching are practically eliminated. Also assisting in this respect is the resilient means 23 which may, under extreme road conditions, engage the end rail 19 of the car frame to automatically raise the chassis upwardly to counteract "nosediving" and pitching. In normal travel over a level roadway however, the resilient means will seldom engage the car frame. Furthermore, it will be evident that "rolling" of the trailer is held to a minimum because the tongue and socket cannot revolve about their respective longitudinal axes or with respect to the king pin 65 or the pivotal connections 17. In practice, the operative relationship between the various components of the coupling and associated parts has proven efficient under all conditions of use without providing a special fitting to allow for relative tilting between the trailer frame and car frame.

Of particular importance, as emphasized above, is the operative relationship between the bearing plates 58 and 60 and friction means 62 which primarily contribute to overcome the majority of the abnormal conditions just referred to. It should be noted that the opposed bearing surfaces of the upper plate and friction means are relatively large so that portions thereof will be spaced from the pivotal connection between the tongue and carriage to promote stabilization. The friction means, in effect, is a bearing means and also serves to dampen any noise that might occur between the bearing plates. More specifically in this respect, the arrangement is preferably such that the weight of the trailer will cause the upper plate 58 to forcibly bear against the friction bearing means 62 and retard, in some measure, the relative rotational movement between the tongue and carriage whenever the car is turned either to the right or left. This unique relationship is such that the frictional coefficient or braking resistance between the upper plate and friction means is just sufficient to prevent "sway" under normal conditions of travel. Whenever any condition such as torsional strain or twisting action tends to occur between the car and trailer, the frictional coefficient will increase to automatically check or dampen this condition, including any of the other abnormal conditions referred to. The drag or braking action produced is directly proportional to the hitch load.

The car and trailer can be readily disconnected by reversing the procedure employed in establishing the connection. It is to be understood that the procedure in disconnecting may be varied in one or more respects. For example, after the wheel assembly 45 is attached to the jack and the latter is operated to support the front end of the trailer, the bolts 38 may be withdrawn from the tie plates 34 and 36 to permit the tongue to be removed from the socket without first tilting the carriage and tongue.

In some trailer parks the trailers of tenants are parked by the proprietors. If the proprietor's vehicle is not equipped with the subject invention then the conventional ball on the vehicle will be utilized in making connection with the conventional socket 43. In some instances, this connection cannot be effected until the carriage and tongue assemblies as a unit are first detached from the trailer by removing the bolts 53 and 83. However, in other instances the clearances may be sufficient to permit this connection without detaching such assemblies. The tongue 24 may be swung out of the way to either side of the V-frame when not in use or to the rear as shown in Figure 4 after the trailer is elevated by the jack.

Chassis specifications vary considerably and in order to further facilitate installation of the supporting means in a greater number of different models or makes of cars a modified construction may be employed to connect the axle of the socket supporting means to the car frame. This modified construction is illustrated in Figure 16 of the drawing and comprises a hanger. Each hanger includes an upper end 86, a lower end 87 and an intermediate portion 88 joining the ends to place them substantially in parallel relationship. The upper end of each hanger is immovably secured against the exterior of the longitudinal rail 89 of the car frame by a pair of bolts 90 and its lower end pivotally supports one end of the axle. It will be noted that the intermediate portion 88 of each hanger is interposed between the rail 89 and a leaf spring 91 and a sufficient distance above the spring to provide clearance for operation of the spring.

In Figure 17 there is exemplified another modified construction that may be used to support the axle of the supporting means. In this construction each hanger includes an upper end 92, a lower end 93 and an intermediate portion 94. The upper end is connected to the car frame by a single bolt 95 and is held against pivotal movement by an angular brace 96 which has one end secured to the rear end of the frame and its other end to the lower end of the hanger. This hanger extends between the frame rail and spring and the brace also extends therebetween. It will be noted that one end of this particular hanger is longer than the other so that it can be arranged in either of two positions to facilitate installation when the chassis specifications are different.

Figure 18 of the drawing depicts a modified construction which avoids the necessity of permanently uniting or welding inserts 97 of fittings in the ends of an axle 98. Each end of the tubular axle 98 is preferably split as at 99 and provided with integral ears 100 through which a bolt 101 extends for contracting the axle upon the insert to lock the insert in place. With this arrangement, each insert can be adjusted to any one of an infinite number of longitudinal and/or rotative positions and then locked to the axle.

As pointed out above, the components of the invention may be designed and constructed in various ways. To this end, Figure 19 of the drawing exemplifies a novel way of attaching a tongue assembly to the V-frame of a trailer without utilizing the pivotal carriage described above. More particularly in this respect, there is shown an attaching means comprising a pair of corresponding supports secured to the outer sides of the channels of the V-frame by pairs of bolts 102. Each support includes a portion 103 of some length which bears against a side wall of a triangular casting 104 so the latter may assist in bracing the supports. The portion 103 is provided with a portion 105 which extends forwardly of the V-frame and downwardly. The portion 105 is provided with an outwardly extending offset portion 106. An upper horizontal plate 107, substantially half round in shape, is rigidly detachably secured to the offset portions 106 by bolts 108. A conventional socket on the casting may be used in some instances without detaching the tongue assembly and/or supports and in other instances by detaching the tongue assembly or supports or both. The tongue assembly of this modified construction corresponds to the preferred embodiment. This particular construction will function to promote normalization or stabilization in the same manner as the preferred construction described above.

While the invention has been described with great particularity, and in the best forms, it will be readily understood that various changes in the arrangements, constructions and combination of parts, as well as substitution of equivalents and substitution of materials may be made in the device without departing from the spirit of the invention as more definitely determined by the appended claims.

We claim:

1. Apparatus of the kind described comprising a carrier having a pair of spaced members, a flat plate permanently secured to the lower ends of the members, supporting means, means for attaching the supporting means to the forepart of a vehicle, means extending substantially horizontally through the members and supporting means connecting the carrier to the supporting means for pivotal movement in a vertical plane, means on the upper ends of the members arranged for connection with means adapted for attachment to the vehicle for locking the carrier in position within said vertical plane, a coupling component adapted for attachment with a complementary component on another vehicle, means pivotally connecting the coupling component to the plate at a point located in the rear of the first-mentioned pivotal connection, and flat bearing means on the coupling component engaging the flat plate for stabilizing movement of the coupling component.

2. A supporting assembly for a coupling member adapted for use on a vehicle comprising a first bearing means having a planar bearing surface, means for supporting the bearing means on a vehicle, means on said supporting means and means on said bearing means whereby the bearing means can be adjusted to a desired position within a vertical plane and then secured in such position, means for preventing vibration between the supporting means and bearing means, a coupling member pivotally connected to the bearing means, a second bearing means immovably secured to the member and having a flat bearing surface cooperable with the said planar bearing surface, and a brake lining interposed between the said bearing surfaces.

3. A support, means for attaching the support to a vehicle, a carrier pivotally connected to the support for adjustment in substantially a vertical plane, means on the carrier provided with a flat portion, a coupling member for connection with a coupling member on another vehicle provided with a flat portion, means pivotally mounting the coupling member to position its flat portion substantially parallel to the first-mentioned portion, and friction producing means secured to one of the portions and engaging the other portion, the arrangement being such that when one portion is pressed toward the other portion the friction means will produce a drag resisting movement of the coupling member in direct proportion to the pressure.

4. A first vehicle, a vertically swinging frame secured to the underside of the vehicle, a socket carried by a part of the frame, resilient means for supporting the frame part, a second vehicle having a forepart, means secured to the underside of the forepart provided with a bearing surface, a tongue pivotally connected to said means, and friction producing means engaging the tongue and the said bearing surface for retarding relative pivotal movement between the tongue and bearing means, and means securing the tongue in the socket to provide a substantially rigid through connection from the pivotal connection and the points of connection between the frame and first vehicle.

5. A coupling socket assembly comprising a support, an angular fitting secured to the supoprt providing an end wall and a bottom wall of the socket, a pair of corresponding elongated guide members constituting side walls of the socket having their inner extremities secured to the fitting to arrange the members in a diverging relationship, a pair of elongated reinforcing members having their inner extremities secured to the support, the outer extremities of the guide members and reinforcing members extending outwardly from the fitting and being spaced apart a predetermined distance, a tie member securing the guide members and reinforcing members together, and said tie member being provided with means whereby the tie member can be utilized to lock a coupling part in the socket when such a part is brought into engagement with the end wall and finds support on the bottom wall.

6. Means for coupling vehicles comprising a pair of coupling components, a frame having an axle and a rod, one of said coupling components carried by the rod, means for attaching the ends of the axle to a vehicle to permit movement of the frame in a vertical plane, bearing means provided with a substantially flat bearing surface, means for attaching the bearing means to another vehicle, means pivotally connecting the other coupling component to the bearing means, bearing means secured to said other coupling component having a planar bearing surface opposed to said flat bearing surface, a braking material interposed between the bearing surfaces, and means for connecting the coupling components.

7. A supporting assembly for a coupling member adapted for use on a vehicle comprising a first bearing means having a planar bearing surface, means for supporting the bearing means on a vehicle, means on said supporting means and means on said bearing means whereby the bearing means can be adjusted to a desired position within a vertical plane and then secured in such position, a coupling member pivotally connected to the bearing means, a second bearing means immovably secured to the member and having a flat bearing surface cooperable with the said planar bearing surface, and a brake lining interposed between the said bearing surfaces.

8. Apparatus of the kind described comprising a carrier having a pair of spaced members, a flat plate carried by the lower ends of the members, supporting means, means for attaching the supporting means to a vehicle, means extending substantially horizontally through the members and supporting means connecting the carrier to the supporting means, means for locking the carrier in a fixed position with respect to the supporting means, a coupling component adapted for attachment with a complementary component on another vehicle, means pivotally connecting the coupling component to the plate, and flat bearing means on the coupling component engaging the flat plate for stabilizing movement of the coupling component.

References Cited in the file of this patent

UNITED STATES PATENTS

| Number | Name | Date |
|---|---|---|
| 959,724 | Dennis | May 31, 1910 |
| 1,044,581 | Sailer | Nov. 19, 1912 |
| 1,713,331 | Davis | May 14, 1929 |
| 2,142,749 | Graves | Jan. 3, 1939 |
| 2,165,608 | Booth | July 11, 1939 |
| 2,306,179 | Mulholland | Dec. 22, 1942 |
| 2,459,965 | Robertson | Jan. 25, 1949 |
| 2,471,636 | Martin | May 31, 1949 |
| 2,531,289 | Murat | Nov. 21, 1950 |
| 2,538,704 | Pole | Jan. 16, 1951 |

FOREIGN PATENTS

| Number | Country | Date |
|---|---|---|
| 351,475 | Great Britain | June 25, 1931 |